United States Patent [19]

Shimono et al.

[11] Patent Number: 5,126,609
[45] Date of Patent: Jun. 30, 1992

[54] SPEED REDUCTION MOTOR WITH INTEGRAL HERMETIC GEAR CASE

[75] Inventors: Nobuo Shimono; Toshio Honjoh; Yoshihiro Itoh; Mamoru Yoshida; Hitoshi Ide, all of Fukuoka, Japan

[73] Assignee: Mitsubishi Denki K. K., Tokyo, Japan

[21] Appl. No.: 642,935

[22] Filed: Jan. 18, 1991

[30] Foreign Application Priority Data

Jul. 20, 1990 [JP] Japan ................... 2-193300

[51] Int. Cl.⁵ .............................. H02K 5/16
[52] U.S. Cl. .......................... 310/83; 310/42; 310/89; 74/421 A
[58] Field of Search .......... 74/421 A, 606 R; 310/83, 89, 42, 88; 29/596

[56] References Cited

U.S. PATENT DOCUMENTS 4,743,174  5/1988  Sato et al. ................ 74/421 A

FOREIGN PATENT DOCUMENTS 54-25409  2/1979  Japan ................... 310/83
1203738  8/1989  Japan.

Primary Examiner—Steven L. Stephan
Assistant Examiner—D. L. Rebsch
Attorney, Agent, or Firm—Sughrue, Mion, Zinn, Macpeak & Seas

[57] ABSTRACT

In a speed reduction motor comprising a motor and a speed reduction device connected to the motor for the purpose of reducing and transmitting rotation therethrough, a gear casing for housing gears of the speed reduction device is formed integrally with a rear gear bracket and a stator frame, so that the number of working steps are reduced and alignment of the gears is enhanced with high accuracy. Further an opening portion is provided on an outer circumference of the gear casing through which the gears can be installed with ease of assembly.

6 Claims, 2 Drawing Sheets

SPEED REDUCTION MOTOR WITH INTEGRAL HERMETIC GEAR CASE

BACKGROUND OF THE INVENTION

The present invention relates to a speed reduction motor, in which a motor and a speed reduction device are connected to one another so as to reduce and output the rotation of the motor through the speed reduction device.

FIG. 3 illustrates a partially-fragmentary plan view showing a conventional speed reduction motor. The conventional speed reduction motor includes a motor 1 and a speed reduction mechanism 11. The motor 1 includes a stator iron core 2 supporting a stator coil 3, a rotor iron core 4 fixed to a rotary shaft 5, a stator frame 6, and a rear bracket 7 fixedly attached to the stator frame 6. The rear bracket 7 supports the rotary shaft 5 at a portion near the rear end of the rotary shaft 5 through a bearing 8. The motor 1 further includes a fan 9 secured to the rear end of the rotary shaft 5 and a fan cover 10 fixedly attached to the rear bracket 7. The speed reduction mechanism 11 includes a gear casing 12 and a rear gear bracket 13 for housing and installing therein gear members. The gear casing 12 has a rear end portion which is opened. The rear gear bracket 13 is fitted to the rear end portion of the gear casing 12 through an O-ring 14 interposed therebetween. The rear gear bracket 13 supports a portion near a front end of the rotary shaft 5 through a bearing 15. The rotary shaft 5 is provided at a front end portion with a first gear 16 which is in the form of a pinion and which has a relatively small diameter. The first gear 16 is meshed with a second gear 17, which has a relatively large diameter and constitutes a part of intermediate gear members. The second gear 17 is secured to a rotary shaft 18 of the intermediate gear members, thereby transmitting the rotational torque of the rotary shaft 5 from the shaft 5 to the shaft 18 while reducing the rotational speed of the shaft 5. The rotary shaft 18 is supported at its front end to the gear casing 12 through a sleeve bearing 19 and at its rear end to the rear gear bracket 13 through another sleeve bearing 20. The rotary shaft 18 is formed with a third gear 21 which is in the form of a pinion and which has a relatively small diameter. The third gear 21 is meshed with an output gear 23 having a relatively large diameter. The output gear 23 is secured to an output power shaft 24, so that the rotational torque of the rotary shaft 18 is transmitted from the rotary shaft 18 to the output shaft 24 while reducing its rotation speed. Thus, the reduced rotation is outputted from the output power shaft 24. The output shaft 24 is supported at its front end to the gear casing 12 through a ball bearing 25 and at its rear end to the rear gear bracket 13 through a sleeve bearing 26. The speed reduction mechanism further includes washers 22 and 27, and oil seal members 28 and 29.

The rear bracket 7 and the stator frame 6 of the motor 1 are connected to the rear gear bracket 13 with through bolts 30.

In the above-mentioned conventional speed reduction motor, the rotation of the rotary shaft 5, which is produced by the motor 1, is reduced by the two-stage speed reduction mechanism and is transmitted to the output shaft 24, so that the rotation of the rotary shaft 5 is output from the output shaft 24 as a low-speed and high-torque rotation.

However, the above-mentioned conventional speed reduction motor is arranged in such a manner that the rear gear bracket 13 is connected to the rear end portion of the gear casing 12, so that it is necessary to machine mechanical connecting surfaces and associated holes for receiving the bearings, with a high accuracy through a large number of machining steps for the centering alignment of the shafts. Further, since the gear casing 12 and the rear gear bracket 13 are to be machined separately, the gear members supported thereto cannot be meshed with each other with a high accuracy, which leads to the generation of noise.

SUMMARY OF THE INVENTION

The present invention was made in order to solve the above-mentioned problem.

It is, therefore, an object of the present invention to provide a speed reduction motor in which a gear casing for housing gear members therein is formed with a gear bracket as a one-piece member, thereby reducing the number of machining steps, forming holes for bearings for supporting shafts of gear members in highly arcuate alignment and enhancing assembling precision of the gear members, and in which intermediate gear members i.e., an intermediate gear and its shaft, can be inserted into the integrally molded gear casing in a state that the intermediate gear is secured to or formed integrally with the shaft.

In order to attain the above-noted and other objects, the present invention provides a speed reduction motor comprising a motor for producing rotation, gear means for transmitting and reducing the rotation, an output shaft for outputting the rotation reduced and transmitted through the gear means, and a casing means for hermetically housing and rotatably supporting the gear means, the casing means being formed as a one-piece member and being provided at its outer circumference with an opening portion through which the gear means are accommodated within the casing means.

According to the present invention, the casing means of the present invention is formed as a one-piece member such that a gear casing is formed integrally with a rear gear bracket, so that the casing means are dispensed with united or connected surfaces conventionally provided between a gear casing and a rear gear bracket, thereby reducing the number of machining steps. Further, noises generating from the gear means can be reduced since gears of the gear means are meshed with each other with high accuracy due to the integral construction of the casing means. In addition, although the casing means are formed as a one-piece member, due to the provision of the opening portion, gear means are accommodated through the opening portion within the case means with a high machining efficiency. Namely, an intermediate gear and its shaft of gear means, are accommodated within the casing means through the opening portion in a state that the intermediate gear is secured to or integrally formed with its shaft outside of the casing means in advance.

BRIEF DESCRIPTION OF THE DRAWINGS

In the accompanying drawings:

FIG. 2 (b) is a cross sectional view of the boss portion shown in FIGS. 1 and 2 (b)

DETAILED DESCRIPTION OF THE PREFERRED EMBODIMENTS

Preferred embodiments of the present invention will hereinafter be described in detail with reference to the accompanying drawings.

Figure 1:
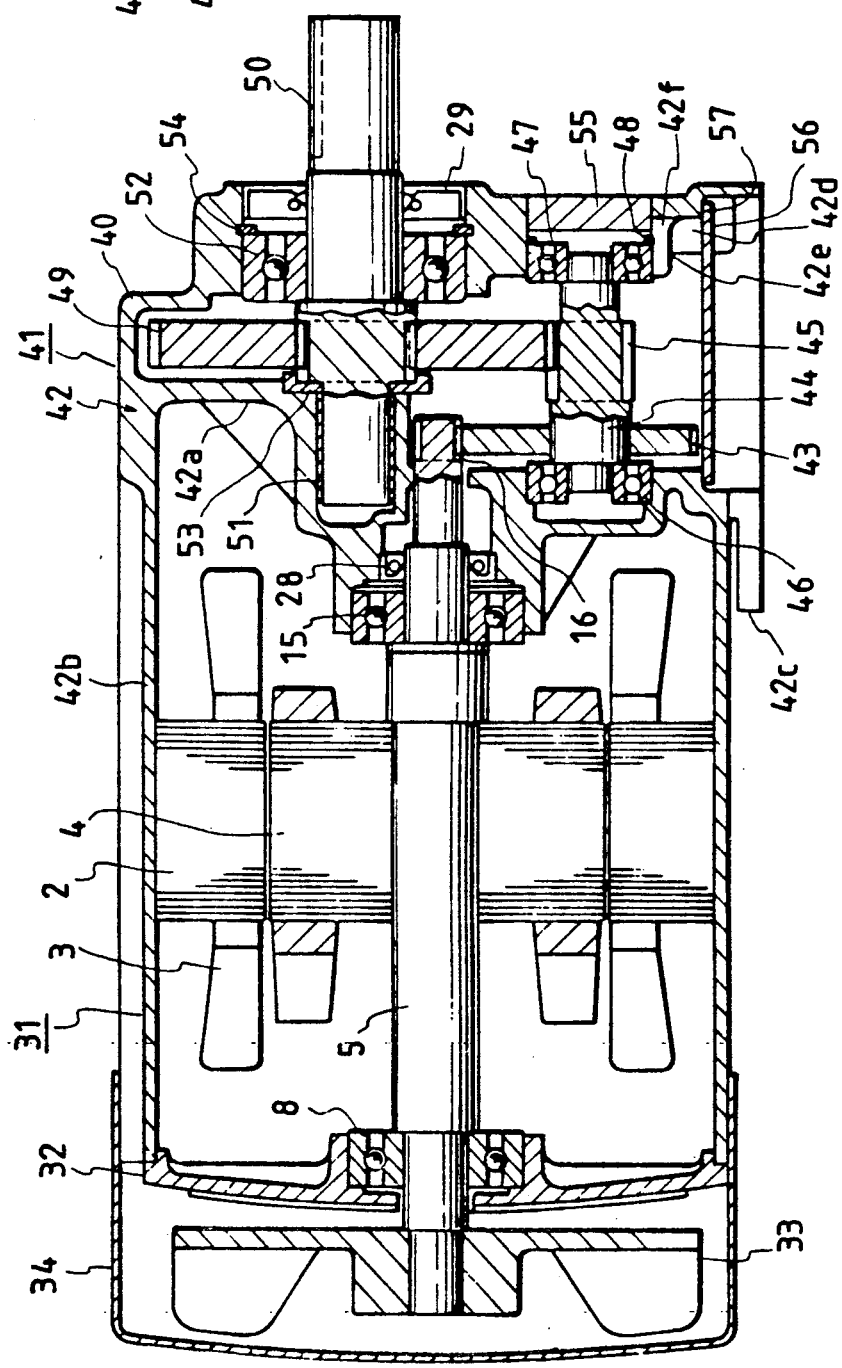
FIG. 1 is a longitudinally sectional view showing a speed reduction motor according to an embodiment of the present invention.
Figure 3:
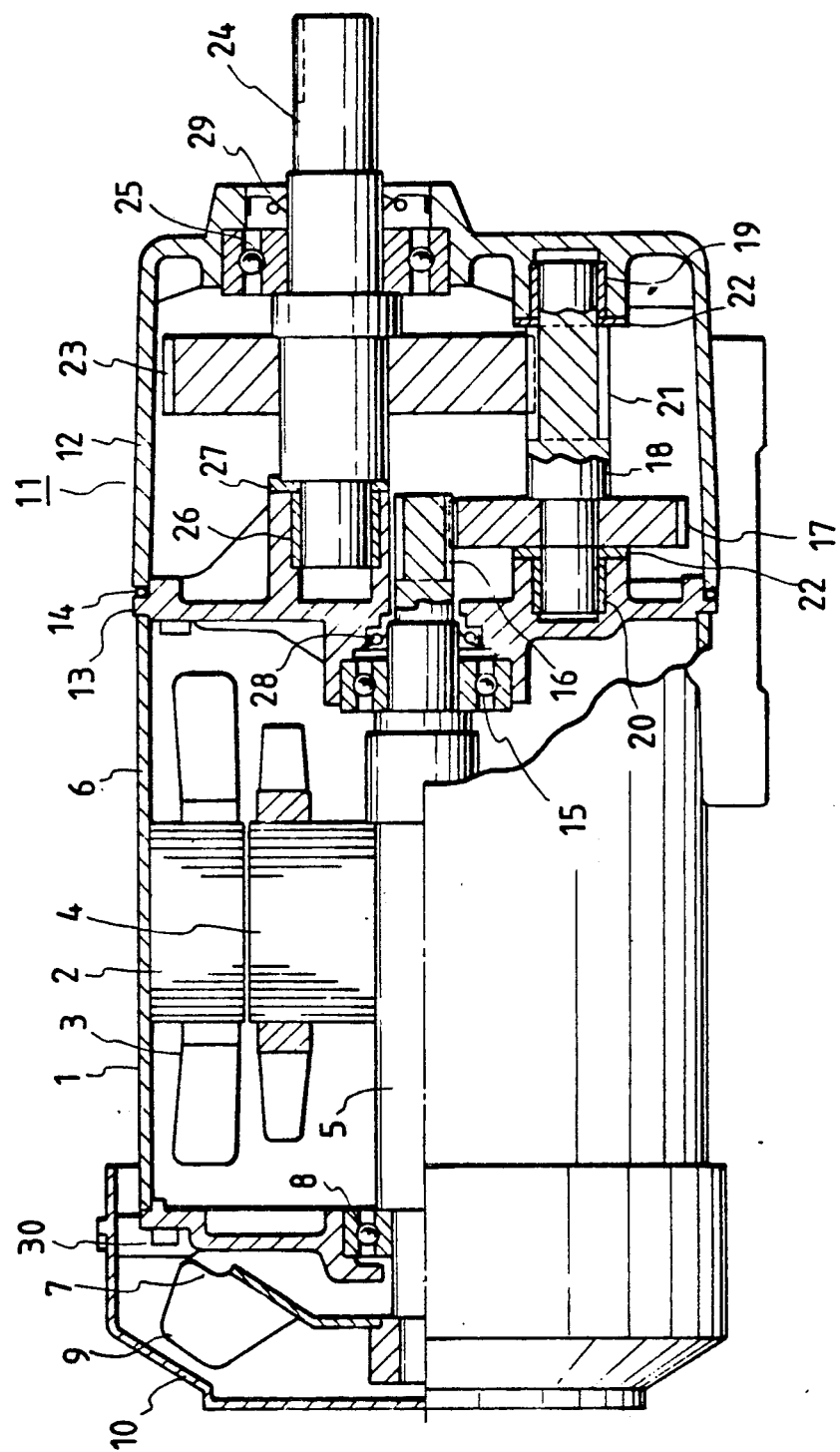
FIG. 3 is a partially fragmentary frontal view showing a conventional speed reduction motor.

FIG. 1 shows a speed reduction motor according to an embodiment of the present invention.

The speed reduction motor comprises a motor mechanism 31 and a speed reduction mechanism 41. The motor mechanism 31 is arranged as follows: A stator coil 3 is fitted around a stator iron core 2. A rotor iron core 4 is securely fixed to a rotary shaft 5. The stator iron core 2 is secured to a stator frame part 42b integrally formed in a gear casing 42. That is, the stator frame part 42b is a part of the gear casing in this embodiment. A rear bracket 32 is attached to the stator frame part 42b at a rear end portion thereof, and the rear bracket 32 supports a rear end portion of the shaft 5 through a bearing 8. A fan 33 is securely fixed to a rear end of the shaft 5. A fan cover 34 is attached to the rear bracket 32.

The speed reduction mechanism 41 is arranged as follows: The gear casing 42 for hermetically housing gear members is formed integrally with a rear gear bracket part 42a, the stator frame part 42b and a main body part 40, and is provided with a mounting leg 42c at the lower part of the main body part 40. The gear casing is further provided with an opening portion 42d at the lower part of the main body part 40. The opening portion 42d has a size large enough to allow each gear member (described later) to pass therethrough. The rear gear bracket part 42a supports a front end portion of the shaft 5 through a ball bearing 15. The shaft 5 has a first gear 16 at its front end portion. The first gear 16 is meshed with a second gear 43 which constitutes an intermediate gear member and has a relatively large diameter. The second gear 43 is fixedly secured to an intermediate gear shaft 44 supported at both ends by the gear casing 42 through ball bearings 46 and 47. A stop ring 48 retains the ball bearing 47 so as to prevent an axial displacement of the ball bearing 47. The intermediate gear shaft 44 is formed with a third gear 45 which is a pinion and is relatively small in diameter. The third gear 45 is meshed with a fourth gear 49 which constitutes an output gear and has a relatively large diameter. The fourth gear 49 is coupled through splines with an output power shaft 50 supported at its rear end by the rear gear bracket part 42a of the gear casing 42 through a sleeve bearing 51 and at its front portion to the main body part 40 of the gear casing 42 through a ball bearing 52. An axial movement of the fourth gear 49 is prevented by an abutment piece 53. A stop ring 54 retains the ball bearing 52 so as to prevent an axial movement of the ball bearing 52. Reference numerals 28 and 29 designate oil seal members. The gear casing 42 is formed with a hole through which the ball bearing 47 is inserted so that a boss portion 42e supports the bearing 47. A cap 55 is provided for covering the hole.

Figure 2A:
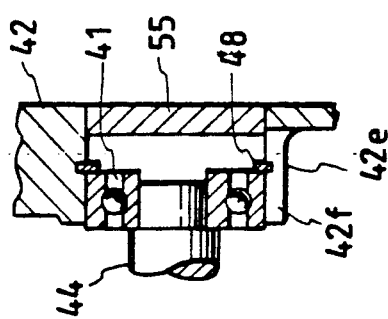
FIG. 2 (a) is a side view showing a boss portion for supporting a bearing which supports a front end of an intermediated gear shaft housed in a gear casing of the speed reduction motor shown in FIG. 1.
Figure 2B:
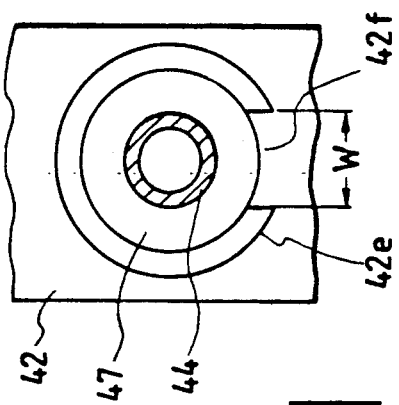

As shown in FIGS. 2 (a) and 2 (b), the boss portion 42e is provided with a notch 42f on the opening portion 42d side so that an inside of the boss portion 42e communicates with an outside thereof through the notch 42f. The notch 42f has a width so as to allow the front end of the intermediate shaft 44 to pass radially therethrough.

Turning to FIG. 1, the opening portion 42d has such a size that the length of the opening portion 42d in the outer circumferential direction of the gear casing 42 is determined so as to allow the fourth gear 49 to pass therethrough, whereas the width of the opening portion 42d in the axial direction is determined so as to allow the intermediate gear shaft 44, to which the second gear 43 and the ball bearing 46 are secured, to pass therethrough. The opening portion 42d is oil-sealed by a cover 56. The cover 56 is provided with a packing plate which is made of nitrile rubber or the like and which is heat-stuck to the cover 56.

The opening portion 42d is provided at the lower part of the gear casing 42, so that the opening portion cannot be seen when the speed reduction motor is installed in place by the mounting leg 42c, thus enhancing the aesthetic outer appearance.

A manner for assembling the gear members within the gear casing 42 will now be described.

The gear casing 42 is placed in a state that the front side thereof is directed upwardly, the sleeve bearing 51 is inserted into a boss portion provided in the rear gear bracket part 42a, and the abutment piece 53 is put on the boss portion. The fourth gear 49 is put on the abutment piece 53. The output shaft 50, onto which the ball bearing 52 is fitted, is inserted into the fourth gear 49, the abutment piece 53 and the sleeve bearing 51 in this order from above, and then the stop ring 54 is fitted onto the gear casing 42. The intermediate gear shaft 44, onto which the ball bearing 46 is fitted and the second gear 43 is securely fixed, is inserted through the opening portion 42d in such a position that an axis of the shaft 44 is kept substantially parallel to that of the shaft 50 which has been installed in the casing 42. In this insertion of the shaft 44, the front end portion of the intermediate gear shaft 44 passes through the notch 42f, so that the front end portion of the intermediate gear shaft 44 is inserted in the inside of the boss portion 42e. Then the intermediate shaft 44 with the ball bearing 46 and the second gear 43 is moved downwardly i.e., toward a boss portion for the ball bearing 46 so that the ball bearing 46 is inserted in the boss portion. After that, the ball bearing 47 is fitted to the front end portion of the intermediate gear shaft 44 from above, and then, the stop ring 48 is fitted onto the inside of the boss portion.

As described above, the intermediate gear shaft 44 can be inserted into the gear casing 42 in such a position that the ball bearing 46 and the second gear 43 are assembled on the shaft 44 outside of the casing 42 in advance, so that the gear members which are installed in the gear casing 42 are assembled with high machining efficiency even if the gear casing 42 is made of one piece.

Additionally, in the above-described embodiment, the notch 42f is provided in the boss portion 42e at the side of the opening portion 42d, but the present invention should not be restricted thereto. For example, without the notch 42f, the intermediate gear shaft 44, onto which the ball bearing 46 and the second gear 43 are secured, may be inserted through the opening portion in an oblique state, thereby accommodating the shaft 44 within the gear casing 42.

Further, in the above-described embodiment, the gear casing 42 is provided with the mounting leg 42 and the opening portion 42d at the lower portion of the gear casing 42, but the present invention should not be restricted thereto. For example, the mounting leg may be provided on the front end portion of the gear casing and, on the other hand, the opening portion may be provided in any portion of the outer circumference of the gear casing, which the intermediate gear shaft or the intermediate gear faces.

Further, in the above described embodiment, the gear casing 42 is formed such that the main body part of the gear casing 42 is formed integrally and simultaneously with the rear gear bracket part 42a and the stator frame part 42b as a single construction, but the present invention should not be restricted thereto. For example, the gear casing may be formed by separated members, one of which is a main body part formed integrally with a rear gear bracket part, and the other of which is a stator frame.

According to the present invention, in a speed reduction motor in which intermediate gear members are interposed between a first gear formed on the front end portion of a rotary shaft of a motor and a forth gear provided on an output shaft, so as to reduce and transmit the rotation of the motor in a two-stage manner, a gear casing is arranged in such a manner that a main body part is formed integrally with a rear gear bracket (or may be formed with both a stator frame and a rear gear bracket), an opening portion is provided on the outer circumference of the gear casing so as to accommodate the fourth gear and the intermediate gear shaft therethrough within the gear casing in a state that a bearing is fitted to an end portion of the intermediate gear shaft and an intermediate gear is secured to or formed integrally with the intermediate gear shaft. As a result, the gear casing is worked or machined in the reduced number of the working steps, assembling of the gear members is performed with a high accuracy and the noise generated by the gear members is reduced. Further, the intermediate gear members may be assembled in advance outside of the gear casing, and then, the assembled intermediate gear members are accommodated within the gear casing, so that the work efficiency is improved.

Although the gear casing has an integral structure for entirely encasing the gear members, due to the provision of the opening portion of an appropriately large size, in the case where the gear casing is produced especially by the die casting, a core of molds can be drawn through the opening portion, so that it is not necessary to form the gear casing having an excessive thickness. As a result, a thickness of the gear casing can be reduced.

Further, a mounting leg is provided on a lower portion of the gear casing and the opening portion is formed on the lower portion, so that the outer appearance of the gear casing is enhanced.

Further, a notch or slit is formed on a boss portion, which is for supporting the front end of the intermediate gear shaft through a bearing, at a side of the opening portion, and the notch or slit is communicated with the inside of the boss portion, so that the front end of the intermediate gear shaft passes through the notch or slit from the outside of the boss portion to the inside thereof. Therefore, when the intermediate gear shaft is accommodated within the gear casing through the opening portion, the intermediate gear, to which the bearing is fitted at its rear end, and the intermediate gear is securely fixed in advance outside of the casing can be inserted in place within the casing in such a position that the axis of the intermediate gear is kept substantially parallel to that of the output shaft. As a result, assembling becomes easy, and further, automatic assembling can be performed.

What is claimed is:

1. A speed reduction motor comprising:
   a motor for producing rotation, including a stator and a rotor;
   gear means for reducing and transmitting said rotation, including a first gear formed on a front end portion of said rotor, an intermediate gear member having a second gear meshed with said first gear, an intermediate gear shaft to which said second gear is secured, a third gear formed on said intermediate gear shaft, and a fourth gear meshed with said third gear;
   an output shaft for outputting rotation reduced and transmitted through said gear means from said motor, said fourth gear being secured to said output shaft;
   a gear casing for accommodating said gear means therein, including a rear gear bracket part for supporting the front end portion of said rotor and rear end portions of said intermediate gear shaft and said output shaft, and a main body for supporting front end portions of said intermediate gear shaft and said output shaft, said rear gear bracket part being formed integrally with said main body part as a single integral member; and
   an opening portion through which said intermediate gear member and said fourth gear are accommodated within said gear casing, said opening portion being provided on said main body part, wherein said main body part includes a boss for supporting the front end portion of said intermediate gear shaft through a bearing, said boss having a notch, through which the front end portion of said intermediate gear shaft passes, at a portion facing said opening portion, said notch communicating with an inner side of said boss portion.

2. The speed reduction motor according to claim 1, wherein said opening portion being provided on a lower part of said main body part.

3. The speed reduction motor according to claim 2, further comprising: a mounting leg for mounting said speed reduction motor in place, said mounting leg being provided on the lower part of said main body.

4. The speed reduction motor according to claim 1, wherein the width of said opening portion is equal to or larger than the diameter of said fourth gear and the length of said opening portion is equal to or larger than the length of said intermediate gear shaft.

5. The speed reduction motor according to claim 1, wherein said intermediate gear shaft and said second gear are formed integrally with each other.

6. The speed reduction motor according to claim 1, further comprising: a frame for supporting said stator, said frame being formed integrally with said gear casing.

* * * * *